United States Patent [19]

Vlasblom et al.

[11] Patent Number: 5,415,789

[45] Date of Patent: May 16, 1995

[54] LEATHER CLEANER AND CONDITIONER

[75] Inventors: Jack Vlasblom, Dunedin; Vincent A. Dotolo, Clearwater, both of Fla.

[73] Assignee: Citra Science Ltd., Largo, Fla.

[21] Appl. No.: 309,122

[22] Filed: Sep. 20, 1994

[51] Int. Cl.⁶ ............................................... C14C 9/00
[52] U.S. Cl. ................................ 252/8.57; 8/94.1 R;
8/94.1 P; 106/11; 106/285; 134/42; 427/384;
427/389
[58] Field of Search .................. 252/8.57; 8/94.1 R,
8/94.1 P; 134/42; 427/384, 389; 106/11, 285

[56] References Cited

U.S. PATENT DOCUMENTS

| | | | |
|---|---|---|---|
| 2,283,540 | 5/1942 | Davis et al. | 252/8.57 |
| 3,656,881 | 4/1972 | Hemwall | 252/8.57 |
| 3,668,124 | 6/1972 | Cassella, Jr. | 252/8.57 |
| 4,158,543 | 6/1979 | Orlowski | 8/94.13 |
| 4,190,687 | 2/1980 | Sugiura et al. | 8/94.1 R |
| 4,285,688 | 8/1981 | Willis | 8/94.1 R |
| 4,554,083 | 11/1985 | Soldanski et al. | 252/8.57 |

FOREIGN PATENT DOCUMENTS 1-174600 7/1989 Japan.
4-218600 8/1992 Japan.

*Primary Examiner*—Anthony Green
*Attorney, Agent, or Firm*—Donald R. Fraser

[57] ABSTRACT

A leather cleaner and conditioner consists of d-limonene, sorbitan monolaurate, mineral oil, lecithin, and butylated hydroxytoluene.

4 Claims, No Drawings

LEATHER CLEANER AND CONDITIONER

FIELD OF THE INVENTION

This invention relates generally to a leather cleaner and conditioner, and more particularly, to a formulation for a leather cleaner and conditioner containing, inter alia, d-limonene, which formulation is non-irritating to the use and is additionally biodegradable.

BACKGROUND OF THE INVENTION

Many commercial products are currently available for cleaning and conditioning leather articles such as saddles and bridles, clothing items, furniture coverings, automobile interiors, fashion accessories such as belts and handbags, and the like. Generally such products incorporate an oil-based soap which is manually applied and worked into the leather with a brush, and thereafter rinsed with water. These soaps tend to be quite irritating to the skin of the user, and moreover are not generally biodegradable. A more user and environmentally friendly leather cleaner and conditioner is needed.

It would be desirable to formulate a leather cleaner and conditioner which could be more easily applied, would be non-toxic and non-irritating to the user, and which would be biodegradable.

SUMMARY OF THE INVENTION

Accordant with the present invention, a non-toxic, non-irritating, biodegradable leather cleaner and conditioner has surprisingly been discovered. It consists of d-limonene, sorbitan monolaurate, mineral oil, lecithin, and butylated hydroxytoluene.

Also included in the present invention is a method of cleaning and conditioning leather utilizing the aforementioned formulation.

The leather cleaner and conditioner according to the present invention is particularly useful for cleaning and conditioning leather saddles and bridles.

Further objects and advantages of this invention will be apparent from the following description and appended claims.

DETAILED DESCRIPTION OF THE PREFERRED EMBODIMENTS

The leather cleaner and conditioner according to the present invention consists of a precise combination of d-limonene, sorbitan monolaurate, mineral oil, lecithin, and butylated hydroxytoluene.

D-limonene is a terpene which occurs naturally in all plants. It is a monocyclic unsaturated terpene which is generally a by-product of the citrus industry, derived from the distilled rind oils of oranges, grapefruits, lemons, and the like. A discussion concerning d-limonene and its derivation from numerous sources is set forth in Kesterson J. W., "Florida Citrus Oil," Institute of Food and Agricultural Science, University of Florida, December, 1971. D-limonene is commercially available from Florida Chemical Company and from SCM Glidco Organics. D-limonene may be present in the inventive formulation at a concentration from about 65 to about 95 weight percent. Preferably, the concentration of d-limonene is about 92.75 weight percent.

Sorbitan monolaurate is present in the leather cleaner and conditioner as an emulsifier and stabilizer. It may be present at a concentration from about 0.05 to about 2.5 weight percent. Preferably, the concentration of sorbitan monolaurate is about 1 weight percent.

The inventive leather cleaner and conditioner contains mineral oil, a well-known highly refined aliphatic- or aromatic-based colorless, tasteless, and odorless petroleum oil. The mineral oil may be present at a concentration from about 0.1 to about 7 weight percent. Preferably, the concentration is about 2 weight percent. A preferred mineral oil may be obtained from Lyondell Petrochemical Company of Houston, Tex. under the product designation "DUOPRIME OIL 90".

Lecithin is contained in the inventive leather cleaner and conditioner, and acts as a wetting and penetrating agent. Lecithin is a well-known mixture of phosphatides, generally derived from degumming soybean oil or obtained from other vegetable seeds. The lecithin may be present at a concentration from about 2 to about 9 weight percent. Preferably, the concentration is about 4 weight percent. A preferred lecithin may be obtained from ADM, Ross & Rowe Division, Decatur, Ill. under the product designation "SOY LECITHIN".

Butylated hydroxytoluene is present in the leather cleaner and conditioner as an antioxidant. The butylated hydroxytoluene may be present at a concentration from about 0.04 to about 2.4 weight percent.

The listed components of the leather cleaner and conditioner may be blended and mixed together in conventional mixing apparatus. The resultant formulation may then be utilized as a leather cleaner and conditioner by spraying or otherwise conventionally applying same to the surface of the leather to be cleaned and conditioned. Thereafter, the residue is merely wiped off of the leather using a clean cloth. Thus, the leather is cleaned and conditioned.

In accordance with the provisions of the patent statutes, the present invention has been described in what is considered to represent its preferred embodiment. However, it should be understood that the invention can be practiced otherwise than as specifically illustrated and described without departing from its spirit or scope.

EXAMPLE

The following ingredients are mixed together in the approximate weight percentages indicated, to prepare a leather cleaner and conditioner, according to the present invention. Thereafter, the formulation is sprayed onto the surface of a leather article. The residue on the surface of the leather article is wiped off with a clean cloth. Thus, the leather article is cleaned and conditioned.

TABLE 1

| LEATHER CLEANER AND CONDITIONER | |
|---|---|
| Ingredient | Weight Percent |
| d-limonene (1) | 92.75 |
| sorbitan monolaurate | 1 |
| mineral oil (2) | 2 |
| lecithin (3) | 4 |
| butylated hydroxytoluene | 0.25 |

(1) GLIDSAFE, from SCM Glidco Organics.
(2) DUOPRIME OIL 90, from Lyondell Petrochemical Company.
(3) SOY LECITHIN, from ADM, Rose & Rowe Division.

This Example may be repeated with similar success by substituting the generically or specifically described ingredients and/or concentrations recited herein for those used in the preceding Example.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A leather cleaner and conditioner composition, consisting of:
   from about 65 to about 96 weight percent d-limonene;
   from about 0.05 to about 2.5 weight percent sorbitan monolaurate;
   from about 0.1 to about 7 weight percent mineral oil;
   from about 2 to about 9 weight percent lecithin; and
   from about 0.04 to about 2.4 weight percent butylated hydroxytoluene.

2. A leather cleaner and conditioner composition, consisting of:
   about 92.75 weight percent d-limonene;
   about 1 weight percent sorbitan monolaurate;
   about 2 weight percent mineral oil;
   about 4 weight percent lecithin; and
   about 0.25 weight percent butylated hydroxytoluene.

3. A method for cleaning and conditioning leather, comprising applying to a surface of the leather a formulation consisting of:
   from about 65 to about 96 weight percent d-limonene;
   from about 0.05 to about 2.5 weight percent sorbitan monolaurate;
   from about 0.1 to about 7 weight percent lecithin; and
   from about 0.04 to about 2.4 weight percent butylated hydroxytoluene.

4. A method for cleaning and conditioning leather, comprising applying to a surface of the leather a formulation consisting of:
   about 92.75 weight percent d-limonene;
   about 1 weight percent sorbitan monolaurate;
   about 2 weight percent mineral oil;
   about 4 weight percent lecithin; and
   about 0.25 weight percent butylated hydroxytoluene.

* * * * *